US009171209B2

(12) United States Patent  
Townend et al.

(10) Patent No.: US 9,171,209 B2  
(45) Date of Patent: Oct. 27, 2015

(54) OVERLAY-BASED ASSET LOCATION AND IDENTIFICATION SYSTEM

(71) Applicants: TYCO ELECTRONICS UK LTD., Swindon, Wiltshire (GB); ADC TELECOMMUNICATIONS, INC., Berwyn, PA (US)

(72) Inventors: Kevin David Townend, Chester (GB); John Michael Hulse, Gwynedd (GB); Ian Butler, Cheadle (GB); David Thomas, Chester (GB); Joe Polland, Eden Prairie, MN (US)

(73) Assignees: Tyco Electronics UK Infrastructure Limited, Dorcan, Swindon (GB); ADC Telecommunications, Inc., Berwyn, PA (US)

( * ) Notice: Subject to any disclaimer, the term of this patent is extended or adjusted under 35 U.S.C. 154(b) by 234 days.

(21) Appl. No.: 13/775,798

(22) Filed: Feb. 25, 2013

(65) Prior Publication Data

US 2013/0223684 A1 Aug. 29, 2013

Related U.S. Application Data

(60) Provisional application No. 61/602,414, filed on Feb. 23, 2012.

(51) Int. Cl.  
*G06K 9/00* (2006.01)  
*G06Q 10/08* (2012.01)

(52) U.S. Cl.  
CPC ............ *G06K 9/00624* (2013.01); *G06Q 10/08* (2013.01)

(58) Field of Classification Search  
CPC ............................ G06K 9/00624; G06Q 10/08  
See application file for complete search history.

(56) References Cited

U.S. PATENT DOCUMENTS

| 7,110,909 | B2 | 9/2006 | Friedrich et al. |
| 2006/0033753 | A1* | 2/2006 | Lai ................................ 345/629 |
| 2008/0255902 | A1* | 10/2008 | Poer et al. ........................ 705/7 |
| 2009/0287587 | A1 | 11/2009 | Bloebaum et al. |

FOREIGN PATENT DOCUMENTS

| KR | 10-2010-0128441 | 12/2010 |
| KR | 10-2011-0095443 | 8/2011 |
| WO | WO 2012/018470 A2 | 2/2012 |

OTHER PUBLICATIONS

International Search Report and Written Opinion for PCT/US2013/027654 mailed Jun. 14, 2013.  
European Search Report for Application No. 13752208.2 mailed Jul. 30, 2015.

* cited by examiner

*Primary Examiner* — Shefali Goradia  
(74) *Attorney, Agent, or Firm* — Merchant & Gould, P.C.

(57) ABSTRACT

A network asset location system and methods of its use and operation are disclosed. In one aspect, the network asset location system includes a mobile application component executable on a mobile device including a camera and a display, the mobile application component configured to receive image data from the camera and display an image on the display based on the image data and overlay information identifying one or more network assets identifiable in the image data. The network asset location system also includes an asset management tracking engine configured to receive the image data and generate the overlay information including an identification of a location of at least one of the one or more network assets within the image.

23 Claims, 10 Drawing Sheets

OVERLAY-BASED ASSET LOCATION AND IDENTIFICATION SYSTEM

CROSS-REFERENCE TO RELATED APPLICATIONS

The present application claims priority from U.S. Provisional Patent Application No. 61/602,414, filed on Feb. 23, 2012, the disclosure of which is hereby incorporated by reference in its entirety.

TECHNOLOGICAL FIELD

The present disclosure relates generally to a system for determining locations of network assets, such as network connections. In particular, the present disclosure relates to an overlay-based asset location and identification system.

BACKGROUND

Large-scale networks and facilities typically include assets of a variety of types which are placed at a variety of locations. For example, a network that is maintained by a telecommunications provider or facility may include networking equipment, such as patch panels, routers, or other networking equipment, in a single rack, in different racks, and across different rooms, buildings, or other locations. Each of these network assets may in turn also include other assets, such as available or occupied network jacks or other network connections useable to route signals among network devices.

Often, a technician is required to service network assets, for example by configuring network connections at a field location. Often, that servicing requires the technician to disconnect and reconnect networking cables, or to otherwise locate, identify and service specific network jack locations or other network assets. When a technician modifies a configuration of equipment (e.g., patch panels) in data centers or splitter nodes in outside environments, it is important to ensure that the technician has located the correct piece of equipment. If the technician identifies the wrong asset for configuration, or does not know how to modify the asset as needed, costly mistakes can happen.

Currently, technicians are required to rely on labeling of network assets, and must correlate those networking locations to change networking configurations, or to otherwise service network assets. When relying on such labeling, it is not uncommon for the technician to incorrectly configure network assets, for example by inserting a plug into the incorrect jack of a patch panel, thereby providing erroneous routing, and resulting in such costly mistakes.

In other types of facilities or circumstances where locations of components of a system are generally constant but of a high number, similar challenges apply. For example, when servicing a vehicle or other types of electronic or mechanical equipment having a large number of possible components that are required to be accessed and adjusted, it can be difficult to determine which components are interconnected, and what electrical components (e.g., fuses, breakers, etc.) are associated with different electrical and/or mechanical subsystems.

Accordingly, improvements in tracking of assets, including racks, panels, and even networking connections are desirable.

SUMMARY

In accordance with the following disclosure, the above and other issues are addressed by the following:

In a first aspect, an asset location system includes a mobile application component executable on a mobile device including a camera and a display, the mobile application component configured to receive image data from the camera and display an image on the display based on the image data and overlay information identifying one or more assets identifiable in the image data. The asset location system also includes an asset management tracking engine configured to receive the image data and generate the overlay information including an identification of a location of at least one of the one or more assets within the image.

In a second aspect, a network asset location system includes a mobile application component executable on a mobile device including a camera and a display. The mobile application component is configured to receive image data from the camera and display an image on the display identifying one or more network assets identifiable in the image data. The network asset location system includes a plurality of identifiers associated with the one or more network assets each positioned at a known location relative each of the plurality of identifiers. The network asset location system also includes an asset management tracking engine configured to receive the image data and generate the overlay information including an identification of a location of at least one of the one or more network assets within the image.

In a third aspect, a method of determining an asset location using an application executing on a mobile device having a camera and a display is disclosed. The method includes capturing image data of a network asset using the camera of the mobile device, the image data including information regarding a plurality of identifiers associated with the network asset and positioned at a predetermined location relative to the network asset. The method also includes displaying an image including overlay information identifying the network asset and a location of the network asset within the image.

In a fourth aspect, a method of determining an asset location using a network asset management engine is disclosed. The method includes receiving image data including image data relating to a network asset, the image data also including information regarding a plurality of identifiers associated with the network asset and positioned at a predetermined location relative to the network asset. The method also includes determining an identity of the network asset based at least in part on recognition of the plurality of identifiers and a relative position of the network asset relative to the plurality of identifiers in the image data. The method further includes generating overlay information identifying a location and an identity of the network asset in the image data.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general, the present disclosure relates to a network asset location system that can be used to identify assets to a technician user. In certain embodiments, the present disclosure describes an application operating on a mobile device having a camera and a display, and can capture image information (e.g. video information), and overlay an identification of a particular asset of interest on that video data when displayed on the display. For example, if the asset of interest is a network asset, the overlay information could be used to identify to the technician a correct network asset (e.g., a network jack or other connectivity element, panel, or portion of a panel, network switch, subrack, network blade or rack) to be serviced. In other embodiments, any of a variety of different electrical or mechanical systems could be identified. In some embodiments, that user can see this overlay information using a realtime, overlay-augmented display.

Figure 1:
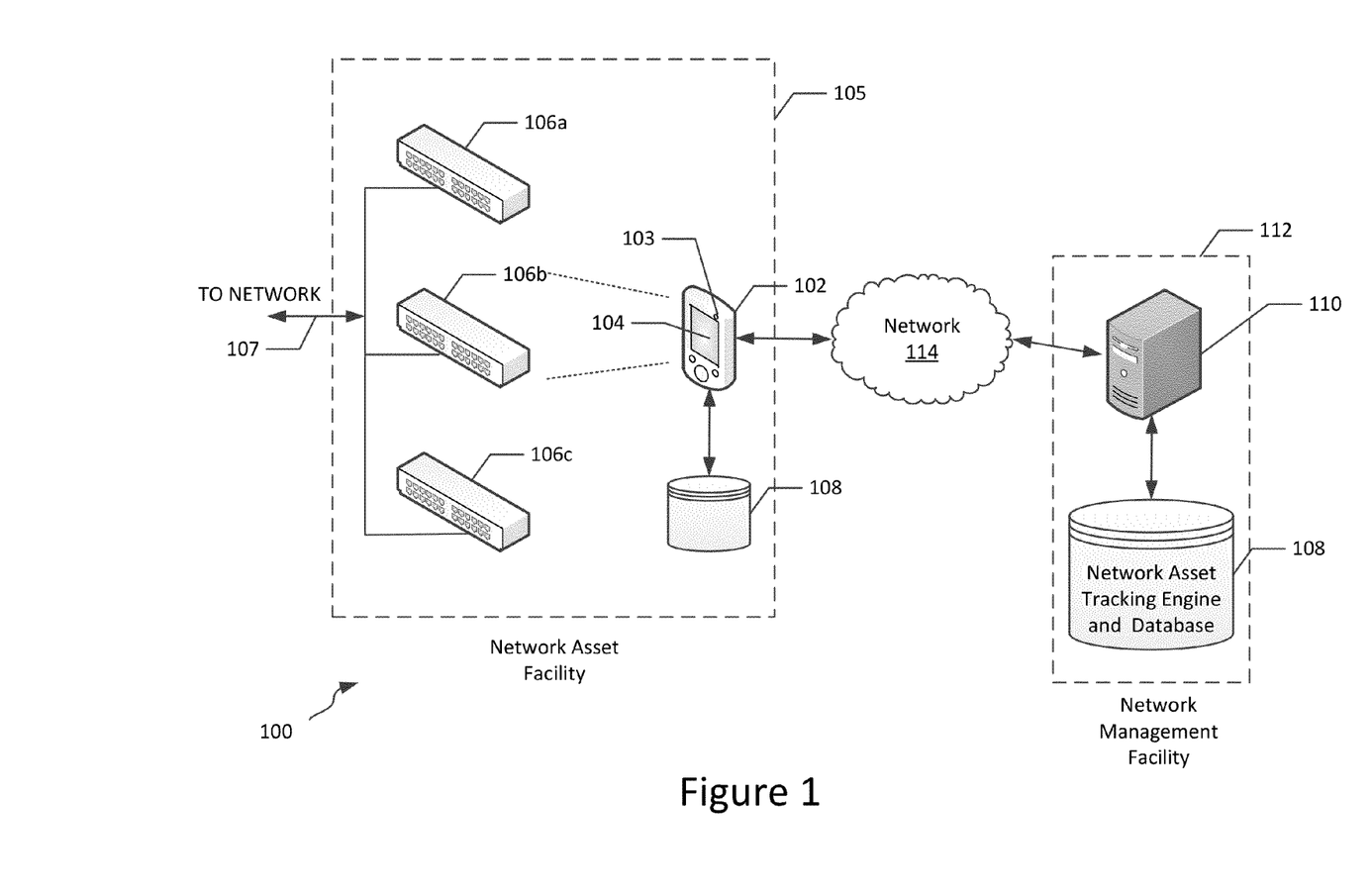
FIG. 1 illustrates an example network asset location system used in conjunction with a distributed networking system in which aspects of the network asset location system of the present disclosure can be implemented.

Referring now to FIG. 1, an example network asset location system 100 used in conjunction with a distributed networking system is shown, in which aspects of the network asset location system of the present disclosure can be implemented. The network asset location system 100 can include, in the embodiment shown a mobile device 102 on which a mobile application component resides, and which can execute the mobile application component. The mobile device 102 can be, in various embodiments, any mobile device including a camera 103 and a display 104, such as a smartphone or tablet computing system. The mobile application component includes program instructions executable on the mobile device 102, and is configured to receive image data from the camera 103 and display an image on the display 104 of the captured image.

In the embodiment shown, the mobile device 102 can be used at a network asset facility 105, which is generally a location where networking equipment is stored. In the embodiment shown, the network asset facility 105 can be a data center or other outside plant application, and can include a plurality of pieces of networking equipment 106, which can, in various applications, include patch panels, data center racks, servers, or other networking equipment. In the context of the present disclosure, any piece of networking equipment or access point provided by such equipment (e.g., telecommunications jacks made available on such patch panels or routers, fiber optic connections, or other physical network access connections) are considered "network assets" which can be configured and provide network data access to subscriber endpoints in a data network.

In the embodiment shown, a plurality of patch panels 106a-c are shown, each of which has a plurality of telecommunications jacks. In accordance with the present disclosure, each of the patch panels 106a-c, or each telecommunications jack, or both, could correspond to a network asset. The patch panels are, in the embodiment shown, included within an overall network 107, which is the network administered and maintained by the technician using the network asset location system 100 of the present disclosure.

In certain embodiments, and as discussed in further detail below in connection with FIGS. 3-8, groups of assets (e.g., patch panels within a particular rack or other device) can be associated with a plurality of identifiers, such that locations of assets that may be difficult to correctly identify (e.g., telecommunications jacks) can be located by triangulation or other relative location calculation procedures. In particular embodiments, the various network assets can include, for example, managed patch panels, such as are described in U.S. Provisional Patent Application No. 61/706,460, filed on Sep. 27, 2012, and entitled "Mobile Application for Assisting a Technician in Carrying Out an Electronic Work Order", the disclosure of which is hereby incorporated by reference in its entirety.

The network asset location system 100 also includes, in the embodiment shown, an asset management tracking engine 108. The asset management tracking engine can, in certain embodiments, reside within a memory of the mobile device 102; in alternative embodiments, the asset management tracking engine 108 can reside at a remote location from the mobile device 102, such as on a server 110 at a network management facility 112. In such embodiments, the mobile device 102 can be configured with a data connection to the server 110, for example via a network 114 (which can include the Internet, as well as any of a number of different types of wireless data networks, such as GSA, SMS, GPRS, EDGE, CDMA, WiFi, WiMax, or LTE networks). In some embodiments, data and/or analysis components of the asset management tracking engine 108 (as illustrated in the example shown in FIG. 2) can be stored at one or both locations (i.e., either at a server 110 or on a mobile device 102).

Figure 2:
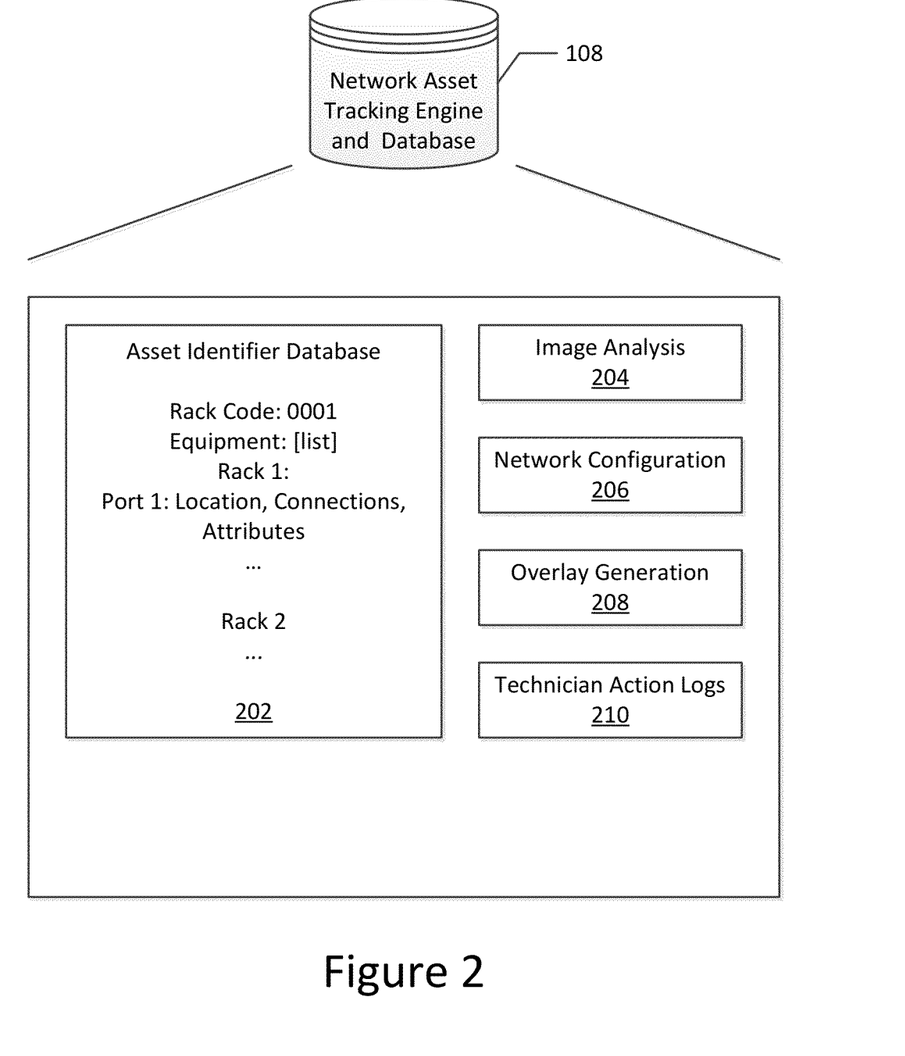
FIG. 2 illustrates an example logical block diagram of a network asset tracking engine useable within a network asset location system, according to a possible embodiment of the present disclosure.

FIG. 2 illustrates an example logical block diagram of a network asset tracking engine 108 useable within a network asset location system, according to a possible embodiment of the present disclosure. The engine 108 generally analyzes image data received from a camera, and generates display information that can identify network assets, identify a location of network assets within an image, and generate an overlay indicating such information to a user by displaying combined image data and overlay information on the display of the mobile device 102.

In the embodiment shown, the network asset tracking engine 108 includes an asset identifier database 202, as well as an image analysis module 204, a network configuration module 206, an overlay generation module 208, and optionally an action log 210.

The asset identifier database 202 stores information regarding each network asset to be tracked by the network asset location system 100. In the embodiment shown, example records are illustrated in the asset identifier database; specifically, each asset can have associated with it a particular location and properties. The location can be a location relative to an identifier near that asset, as illustrated in further detail below in connection with FIGS. 3-6. The location can also include information about a particular asset location at which the asset can be found. The properties associated with the asset can include, for example: an asset identifier, an asset description (e.g., telecommunications jack), associated assets (e.g., a patch panel or rack in which the jack is found), and current connections through that asset (e.g., whether a particular jack has a plug inserted into that jack). Although the particular properties may vary by asset or type of asset (e.g., a jack, a panel, a rack, a router, etc.), generally the records in the database provide a definition of the asset and how to identify it in an image of an overall group of one or more assets that may be captured in an image taken by a camera of a mobile device.

In certain embodiments, as discussed in further detail below, identification of the asset can correspond to an image recognition process relating to both the asset and to a location identifier associated with a group of one or more assets that uniquely define those assets. Examples of such an identifier are discussed in further detail below in connection with FIGS. 3-8.

The image analysis module 204 analyzes image data received from a camera of the mobile device 102, and accesses information in the asset identifier database 202 to detect identifiers in the image data and determine a corresponding asset identification. The image analysis module 204 can also identify particular related assets that are required to be serviced if the asset identifiers are not uniquely associated with the asset to be serviced. For example, asset identifiers may be placed on a particular networking equipment rack, but a specific telecommunications jack on a particular panel within that rack may require service. Accordingly, this related asset to the asset directly identified by the asset identifiers can be detected by comparison to the asset identifiers, and based on a known relative location of that asset to the asset identifiers as included in the asset identifier database 202. For example, if three or more identifiers are viewable within the image, the image analysis module could apply one or more triangulation algorithms to determine the location of a particular network asset. In another embodiment, one or more features within an identifier (e.g., if the identifier includes one or more images) can be used to determine relative distance, orientation, and location, using the image analysis module. Other location-based algorithms are possible as well.

The network configuration module 206 can optionally be included in the network asset tracking engine 108, and in the embodiment shown determines actions required to be performed by a technician. The overlay generation module 208 generates overlay information to be displayed with the image data on a display of the mobile device, and can include, for example: information identifying a particular asset; information identifying related assets; information identifying a particular action to be taken by a technician (e.g. as determined by the network configuration module 206), and other guidance as needed for the technician to service the equipment at the network asset facility (e.g., instructions for configuring the asset). Such information can include, for example, specific steps to be taken to configure a particular asset being identified. For example, information can be generated for delivery to a mobile device 102 to instruct a technician to connect or disconnect a particular plug or wire from a specific socket or connection, or step-by-step instructions for programming a programmable panel, replacing a blown fuse or resetting a tripped circuit breaker, or other options.

Figure 5:
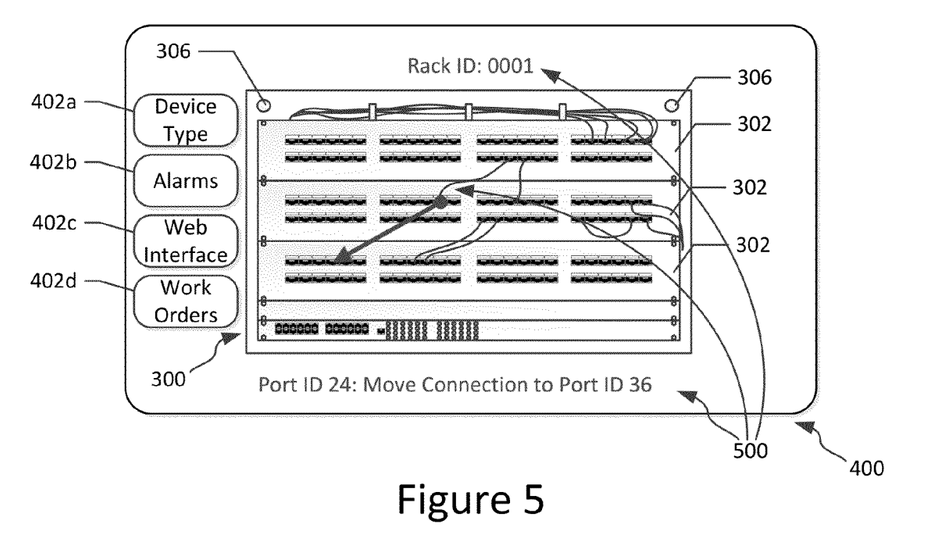
FIG. 5 is a schematic diagram illustrating an example display on a mobile device illustrating the tracked network asset and an overlay provided based on identification of the tracked network asset, according to a possible embodiment of the present disclosure.

Additionally, the overlay information can include, for example, additional details regarding operation of the particular asset. In the case of a network asset such as a rack system or switch, information such as a traffic load, power consumption, internal temperature, or memory usage could be provided in the overlay information, as well as a display of memory usage, available services at the device (or a particular port of the device). Additionally, a number of ports or jacks actively in use, or system utilization, could be displayed. A generalized example of such overlay information is illustrated in FIG. 5.

The action log 210 stores received actions as entered by the technician, based, for example, on the technician following the guidance provided by the overlay information displayed with the image on the mobile device. For example, the action log can store a technician-entered report indicating movement of a telecommunications plug from a first identified jack to a second identified jack, based on guidance provided in the overlay. Alternatively, the action log 210 can store information based on other feedback mechanisms, for example based on a confirmation via the network itself that a connectivity change has been made (e.g., by transmitting a polling query to the newly-connected port, determining that additional or different endpoints can be reached based on a changed network configuration, or other mechanisms).

Referring now to FIGS. 3-8, example schematic illustrations of operation of the network asset location system 100 is shown, from the perspective of a technician at a particular network asset location (e.g., location 105 of FIG. 1).

Figure 3:
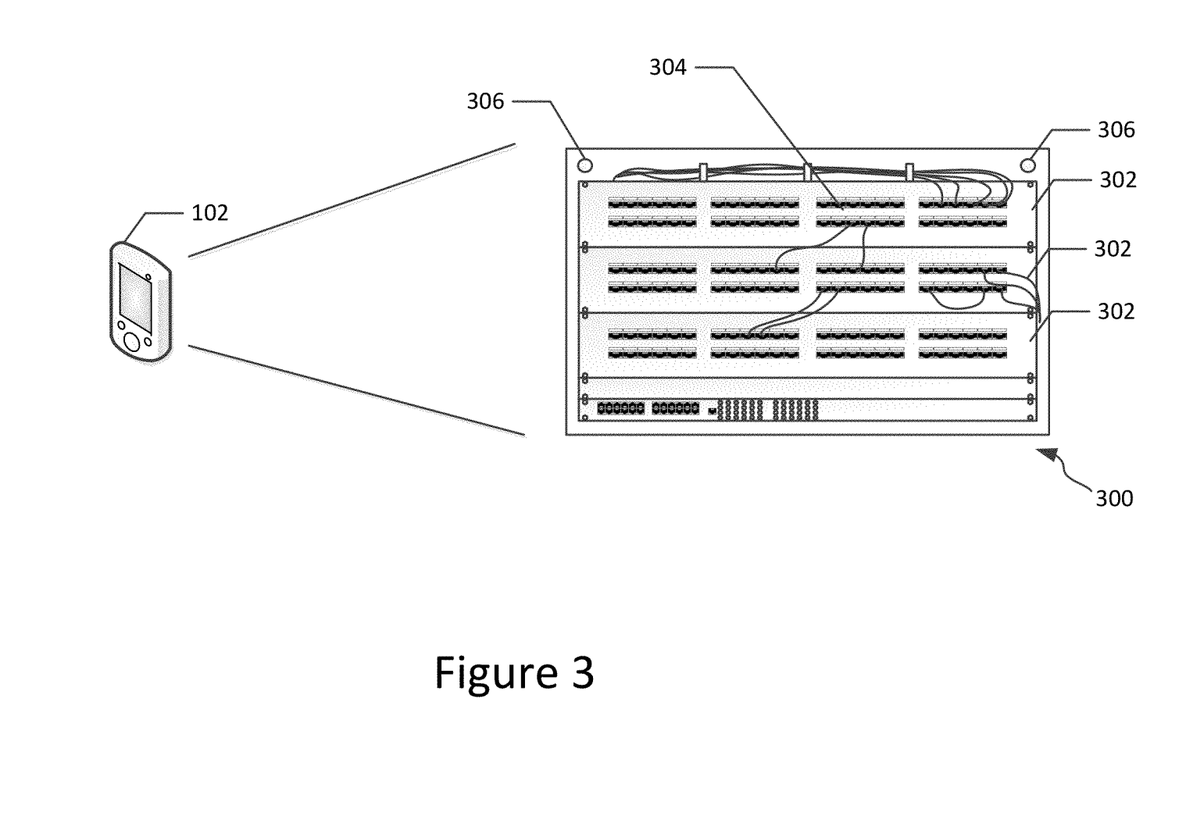
FIG. 3 is a schematic diagram illustrating an example arrangement for tracking network assets, according to a possible embodiment of the present disclosure.
Figure 4:
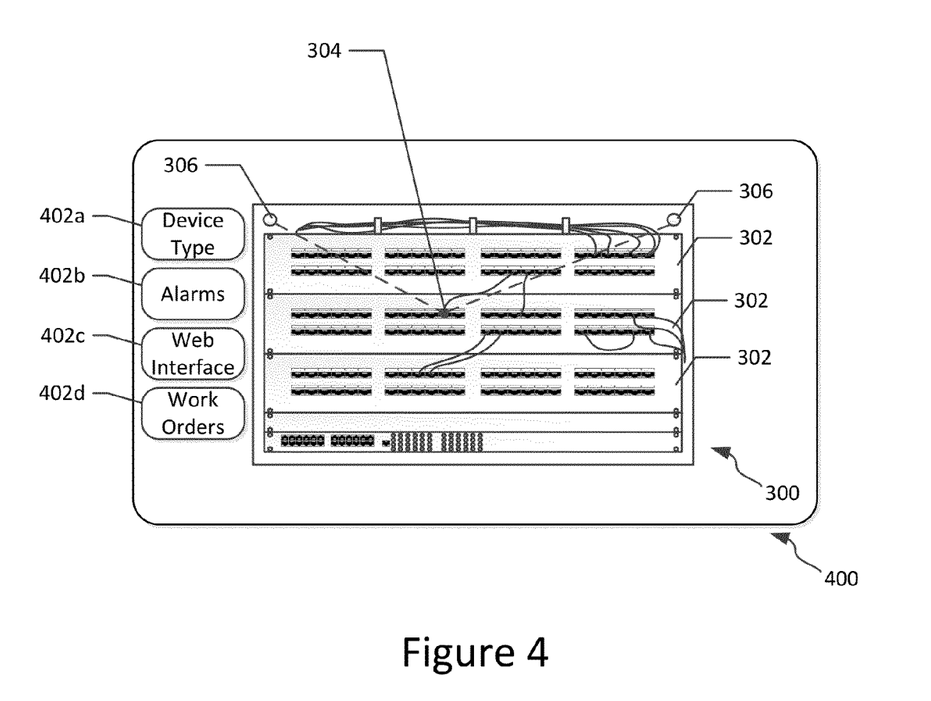
FIG. 4 is a schematic diagram illustrating an example display on a mobile device illustrating the tracked network asset, according to a possible embodiment of the present disclosure.

FIG. 3 is a schematic diagram illustrating an example arrangement for tracking network assets, according to a possible embodiment of the present disclosure, while FIG. 4 illustrates an example display 400 of those network assets captured as shown in FIG. 3, as well as a depiction of triangulation to determine locations and identities of related assets. FIG. 5 illustrates the example display 400 including additional overlay information as determined using the asset management tracking engine 108.

Referring now to FIGS. 3-4, in the embodiment shown the technician activates a mobile application on a mobile device 102 to capture image data regarding a particular network asset. In this example, the technician is capturing video image data of a telecommunications rack 300 including a plurality of patch panels 302 and associated telecommunications jacks 304; however, in other embodiments, other types of telecommunications equipment can be viewed.

As briefly discussed above, a set of identifiers 306 are affixed to the telecommunications equipment, and uniquely identify the telecommunications equipment. In the embodiment shown, the set of identifiers are placed at predetermined locations on the telecommunications rack; however, in alternative embodiments, separate identifiers could be used for each of the patch panels 302 or other network assets.

In various embodiments, the set of identifiers can uniquely identify the telecommunications equipment that they are attached to or otherwise associated with in a number of ways. For example, the identifiers 306 can be light emitting diodes associated with a switching controller such that they are configured to emit light representing a bit code that corresponds to an ID of the rack 300.

In alternative embodiments, the identifiers 306 can be bar codes, QR codes, or images that are unique and associated with particular telecommunications equipment. For example, a particular image may have a known scale and orientation relative to an asset; as such, the recognized size and orientation of the image can be scaled and relative position determined to derive the relative location of an asset to that image. In still other embodiments, one or more liquid crystal displays could be used as an identifier; corresponding targeting arrangements could be used in that circumstance as well.

It is noted that, in an application associated with telecommunications equipment in data centers, it may be possible that low-light conditions make such image-based identification more difficult. In such applications, it may be advisable to use the above-described flashing LED configuration, or an LCD display with adjustable brightness levels. Alternatively, a constant LED flash light included with a camera of a mobile device could be used to illuminate image-based identifiers.

As illustrated in particular in FIG. 4, it is noted that although the identifiers may be associated with one particular piece of equipment (e.g., rack 300) it may be the case that a technician may need to identify and service a particular telecommunications jack or other subcomponent of that equipment. In such cases, a network asset tracking engine 108 stores information regarding relative locations of the subcomponent to the identifiers, allowing the network asset tracking engine 108, and in particular the image analysis module 204, to triangulate to the subcomponent, thereby identifying the subcomponent that is the asset.

In the embodiment shown, the display 400 of the telecommunications rack includes a plurality of navigation buttons 402a-d, and additionally includes various touch-screen functionality useable to both view and provide information about the asset being reviewed. For example, in the embodiment shown, the navigation buttons 402a-d include a device type button 402a, an alarms button 402b, a web interface button 402c, and a work orders button 402d. The navigation buttons 402a-d can, in some embodiments, be used in conjunction with a user selecting a particular piece of identified equipment as discussed herein (e.g., a rack, panel, or a particular connection on a panel) to identify specific information regarding that equipment. For example, the device type button 402a allows the user to obtain additional details about a selected asset, such as its asset label, the type of equipment, associated assets (e.g., a network in which the asset is connected, or routing information associated with the asset), capacity, usage, or other information. The alarms button 402b can be used to either display alarms associated with the particular asset that is selected, or to view all alarms within a network. The web interface button 402c can be used to allow the user to log in to a web interface that provides a control panel for the selected asset, particularly in the case of a panel or rack, to allow the user to view operational parameters (e.g., workload, temperature, logs, etc.) of the asset.

Additionally, the work orders button 402d can be selected to display pending work orders, for example work orders associated with one or more assets recognized in the image captured by the mobile device 102, or generally within a network configured to be tracked by the mobile device. Each electronic work specifies one or more steps that are to be carried out by a technician at a particular location. For example, an electronic work order can indicate that one or more connections implemented on a patch panel (e.g., panels 106a-c above). A menu displayed following selection of the work orders button 402d can also allow the user to create a work order associated with one or more assets of interest and identified on the display 400. In such embodiments, the user can, for example, select first and second ports by capturing images of the equipment including those ports, and tapping on the ports to receive an identification thereof from server 110. The user can then define one or more actions to take with respect to the equipment (e.g., connecting a cable between specified ports of specified panels, or other actions), which is confirmed at the server 110, which can be configured to verify that the specified connection has been added, removed, and/or changed correctly based on communication with the associated asset. An example work order definition process is illustrated in U.S. patent application Ser. No. 13/683,866, entitled "Intelligent Infrastructure Management User Device", filed on Nov. 21, 2012, the disclosure of which is hereby incorporated by reference in its entirety.

Figure 6:
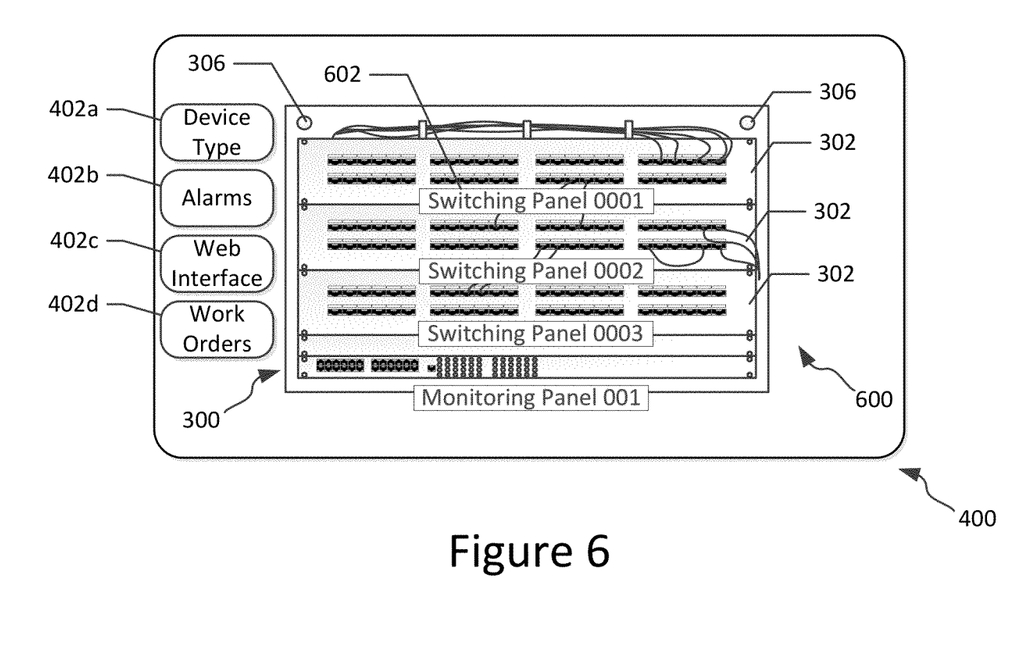
FIG. 6 is a schematic diagram illustrating an example display on a mobile device illustrating the tracked network asset and an overlay that provides asset identification information displayable to a user, according to a possible embodiment of the present disclosure.
Figure 7:
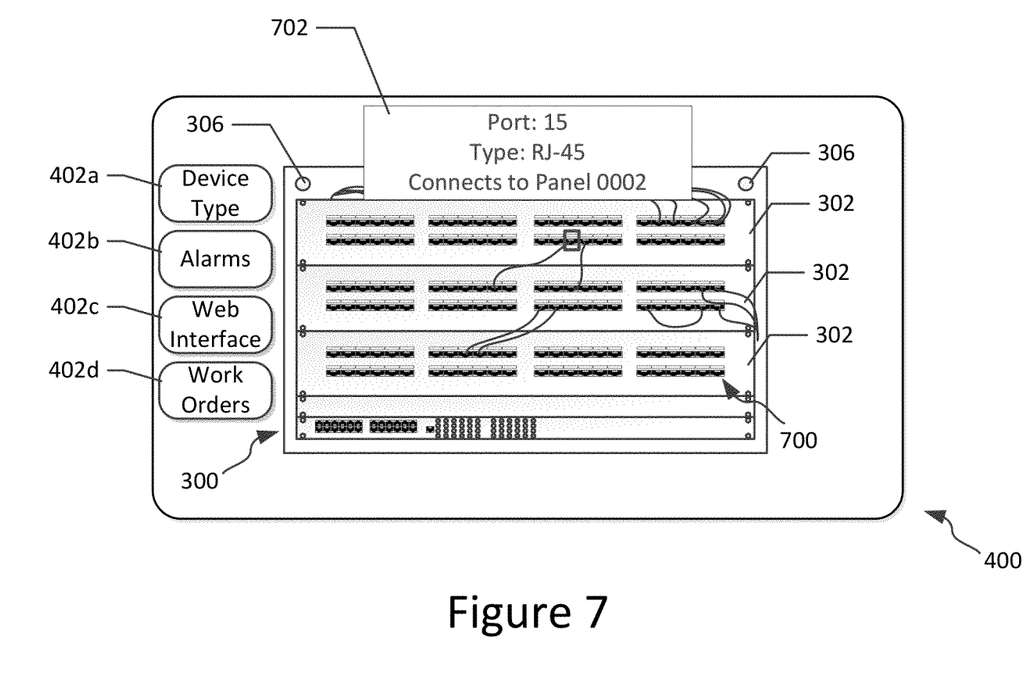
FIG. 7 is a schematic diagram illustrating an example display on a mobile device illustrating asset detail information displayable to a user, according to a possible embodiment of the present disclosure.

Now referring to FIGS. 5-7, various example user interfaces are shown, presented on display 400, for presenting asset and associated overlay information associated with a work order or device identification. As illustrated in FIG. 5, based on the image captured and analyzed, a display 400 of a mobile device 102 can include not only the image illustrated in FIG. 4, but also overlay information 500 identifying one or more assets visible in the image, as well as information about those assets, such as service to be provided. In the embodiment shown, the overlay information 500 identifies a telecommunications jack to which a plug is connected, as well as a second telecommunications jack that is intended to receive that plug. Because the identifiers 306 are associated with the rack in which the jacks are found, each individual jack is found by triangulation to those locations, as discussed above. In the embodiment shown, the overlay information 500 includes information about the asset associated with the identifiers 306 (i.e. the rack 300, as shown by "Rack ID: 0001"), and also includes identifying a location and a label for one or more sub-assets (e.g., the telecommunications jacks 304 labeled "Port ID 24" and "Port ID 36" shown in FIG. 5). These can include, for example, CPID codes for each asset or sub-asset that is tracked. In some embodiments, the overlay information 500 includes instructions for providing service to the network assets, such as by disconnecting and reconnecting network assets. Other types of service or operational information could be described in the overlay information as well, such as insertion counts, cable length, cable category (e.g., Category 5, Category 6, etc.) and other types information such as those listed above.

Preferably, the display of both image data and overlay data is provided in realtime or near realtime with capture of the video image data. This will allow the technician to move the mobile device, allow the locations of network assets to be recomputed, and the display and overlay information updated as the mobile device changes position. In alternative embodiments, the overlay information and image data can be still image data and static overlay information. Other arrangements are possible as well.

Referring to FIG. 6, in this example, the display 400 presents to the user an interface including overlay information 600 that includes labels for the various types of identified equipment included in the illustration. In this example, an overlay label 602 can be included, either upon selection of the device type button 402a, or in response to tapping on the display in a location where the device is displayed, to show the identity of the device, including a device type, software version (if applicable, such as in the case of a managed panel), manufacturer, manufacture date, and any associated alarms. In addition, in some embodiments, other information associated with the device can be displayed. For example, in FIG. 7, overlay information 700 can include a detailed information area 702 that displays routing and type information associated with the asset being identified. For example, the detailed information area 702 can display information about routing from a panel, such as an identifier of another panel to which the current panel is connected, which may not be depicted on the display 400. Additionally, various misconfigured or error-state systems can be highlighted by accessing error reports stored at the server 110 when generating the overlay information 702.

In some example embodiments, the additional information associated with the asset in the detailed information area 702 can include a textual or graphical description of a full routing arrangement including the particular asset (e.g., a connection or panel), from a host to a switch, from a switch to a switch or router, or some other type of communicative connection.

In accordance with the display 400 shown in FIGS. 4-7, it is noted that a variety of other types of information could be presented to a user who taps on an asset or one of the buttons 402a-d shown on the display 400. For example, a user can tap on a particular asset that is a device to display warranty information associated with the device, or to get further information about the panel or blade, or port of such a device, by tapping on the device itself. Additionally, for technicians who wish to fulfill work orders, supplemental information can be presented to the user as well, such as instructional videos or diagrams that illustrate how to accomplish various routing and/or maintenance tasks.

It is also noted that, although in the embodiments described herein specific types of information are depicted, a user of a mobile device 102 in accordance with the present disclosure can also provide feedback for storage in database 108, for example work order or asset identification information. For example, a user of a mobile device 102 can, in some embodiments, tap on the display to define interconnections between equipment that should be made, thereby creating one or more work orders for other technicians to execute. Additionally, options can exist for a user to select and reset one or more settings of a particular device via remote control through server 110 at the network management facility.

Figure 8:
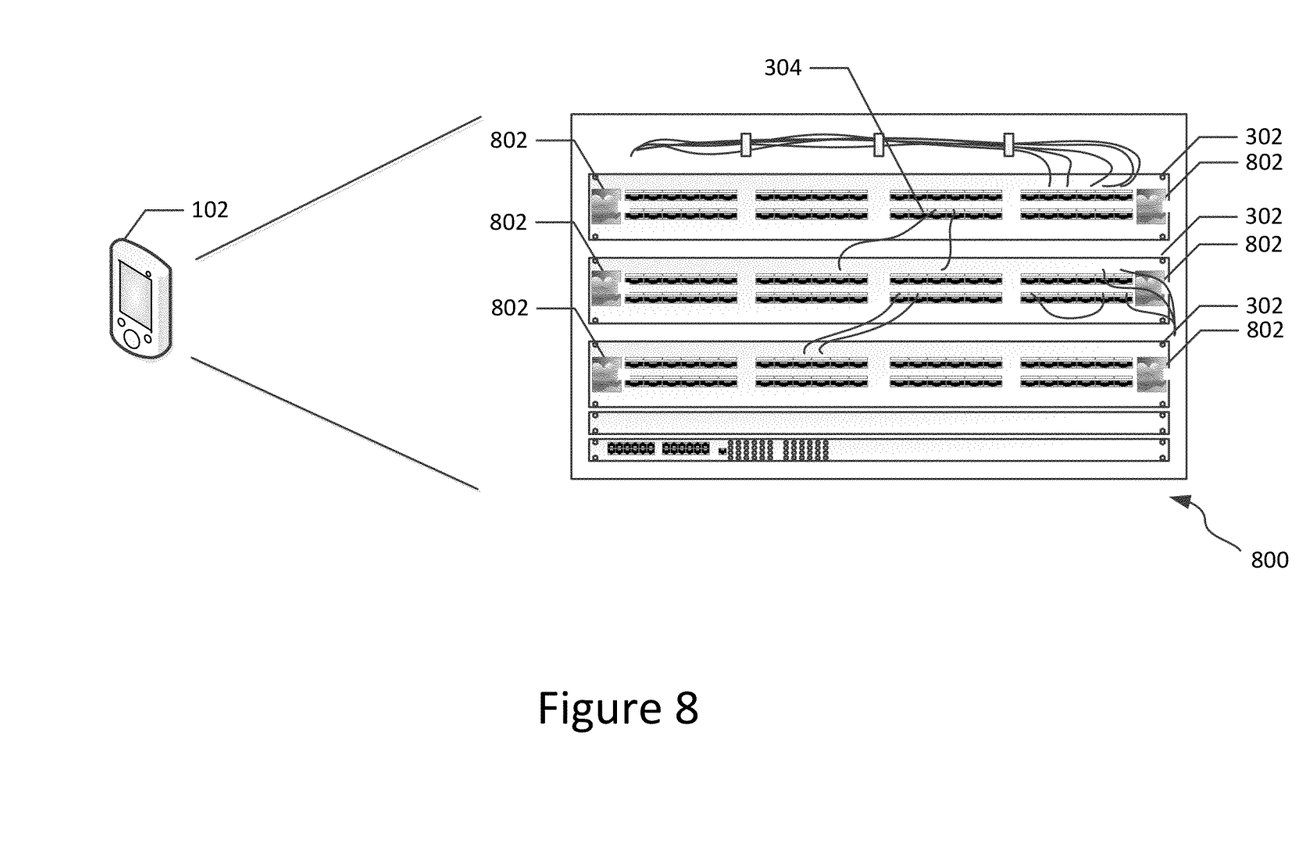
FIG. 8 is a schematic diagram illustrating an example arrangement for tracking network assets, according to a second possible embodiment of the present disclosure.

Referring now to FIG. 8, an alternative embodiment of an arrangement 800 for tracking network assets is shown. The arrangement 800 could be used in place of arrangement 300, but includes different types and arrangements of identifiers used in connection with specific network assets. In particular, in the embodiment shown, each patch panel 302 has an associated set of identifiers 802 placed on opposing sides of an array of connectors 304, which can reduce complexity in triangulating to calculate the position of a particular asset (e.g., a jack) when generating overlay information 500. In various embodiments, different images 802 can be used on each panel 302 (or different images can be used on opposite sides of the same panel), to assist in uniquely identifying a network asset. It is understood that analogous overlay information to that illustrated in FIG. 5 could be generated for association with the arrangement 800 of FIG. 8, using the images 802 within the arrangement 800 to determine relative positions of assets.

In still further embodiments, one or more additional images could be placed on the panel 302 or other assets, such that each tracked asset has an associated unique image. For example, a separate, unique image could be located on each panel associated with each connector 304, or in combination with an LED or bar code arrangement, to identify an asset, such that reduced triangulation calculations would be required (i.e., each image could be placed in a predetermined or known location relative to the asset).

Figure 9:
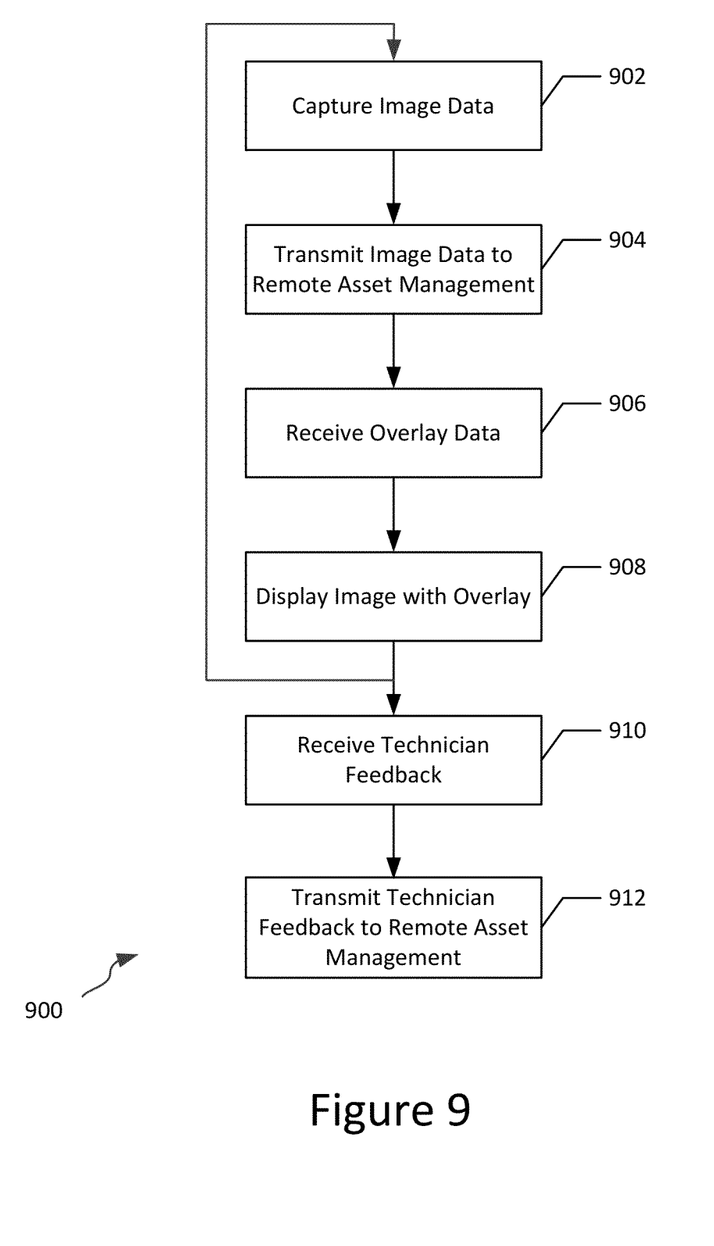
FIG. 9 is a flowchart of methods and systems for tracking network assets using a mobile device, according to a possible embodiment of the present disclosure.
Figure 10:
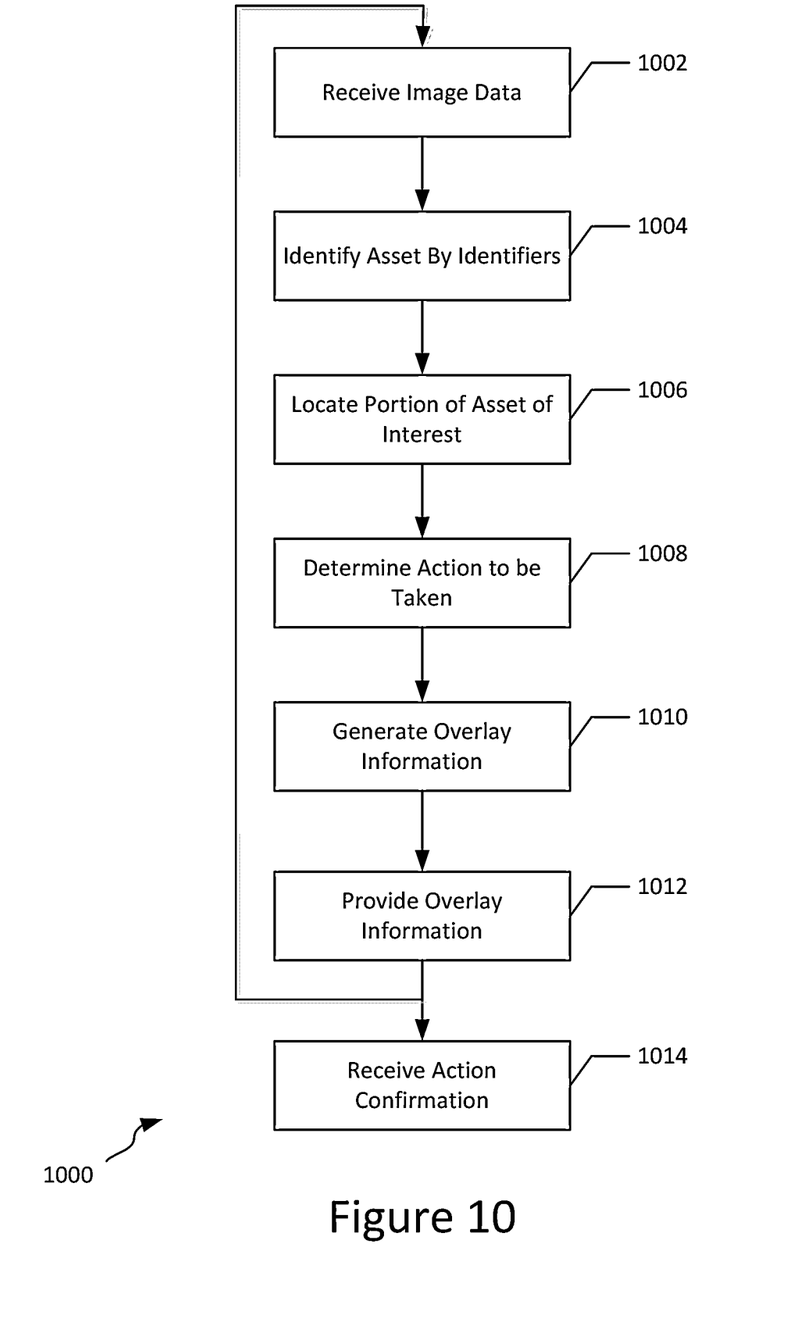
FIG. 10 is a flowchart of methods and systems for tracking network assets using a mobile device and/or a network asset tracking engine and database remote from the mobile device, according to a further possible embodiment of the present disclosure.

Referring now to FIGS. 9-10, methods of tracking and identifying network assets are described, using the structures and information described above in connection with FIGS. 1-6. FIG. 9 is a flowchart of a method 900, as may be performed or implemented using software systems of a mobile device, for tracking network assets using a mobile device, according to a possible embodiment of the present disclosure. The methods and systems illustrated in FIG. 9 can be performed using any of a number of embodiments of a network asset location system as discussed above in connection with FIGS. 1-6.

In the embodiment shown, the method 900 begins with capture of image information (e.g., still or video information) using a camera of a mobile device, such as mobile device 102 (step 902). The captured image data is then transferred to a network asset tracking engine 108, either at the mobile device such as device 102, or a server 110 at a remote location 112 (step 904). The mobile device then receives overlay information, either generated locally on the mobile device or remotely at the server 110, but in either event generated within the network asset tracking engine 108 (step 906). A display operation generates a display of the image including a network asset and overlay information highlighting the location and identity of the network asset, as well as optionally other information, such as identities and locations of other network assets, or actions to be taken by a technician to service the network asset, such as is shown in FIG. 5 (step 908).

In certain embodiments, the method 900 can include receiving feedback from the technician, for example to log services or configurations performed by the technician. In such embodiments, a technician may input into the mobile device information regarding the specific services provided to the network asset (step 910). In embodiments in which a remote server is used to track such technician activity, the received input from the technician regarding services performed can be communicated to the server to be logged (step 912).

FIG. 10 is a flowchart of a method 1000 for tracking network assets using a mobile device and/or a network asset tracking engine and database remote from the mobile device, according to a further possible embodiment of the present disclosure. The methods in FIG. 10 may be performed or implemented using software systems of a server, a mobile device, or both systems.

In the embodiment shown, the network asset tracking engine 108 receives image information captured by a mobile device (step 1002). This can occur, for example, within the mobile device, or based on transmission of that image data from a mobile device to a server on which the network asset tracking engine resides. The image analysis module 204 of the network asset tracking engine 108 (as shown in FIG. 2) can analyze the received image data, and identify one or more network assets identifiable within the image data, for example by decoding information communicated by way of the asset identifiers associated with a particular asset (step 1004). This can include, for example, decoding a bar code or QR code, or detecting a code communicated by a strobed LED, as well as recognizing a particular image or images placed in association with the asset. Other configurations are possible as well.

A network asset can then be located within the image data, for example based on triangulation from the identifiers that are identified, and based on information regarding relative positions of the asset and identifiers as maintained in database 202 (step 1006). An action to be taken is determined (step 1008) for example based on pre-programmed indication of necessary service to be performed on a particular network asset, or based on user definition of a new work order that is to be created associated with the asset, as received from the mobile device 102. Overlay information is then generated (step 1010) and provided to the display of the mobile device (step 1012), to communicate the identification and location of the network asset to the technician, or to communicate various other information to the technician as required for interaction with the asset (e.g., warranty, error, status, or instructional information, as explained above).

In embodiments such as those discussed above in which feedback is received from a technician regarding service actually performed, the network asset tracking engine 108 can receive feedback information (step 1014), and can store that information, for example in action log 210.

As illustrated in both FIGS. 9-10, it is noted that once overlay information is provided to a mobile device, the mobile device may obtain additional image data (e.g., due to capture of video data, or a subsequent image). In such an event, the user of the mobile device may have changed the location of the mobile device, such as by switching its focus, moving the device closer to or further from the assets to be identified, or other movements. In such instances, the present application provides for continual (or periodic) updating of overlay data as image data is received from the mobile device. As seen in FIG. 9, that method could restart with a subsequent image capture (step 902) after displaying image and overlay data (step 908). In FIG. 10, additional image data could be received and processed (step 1002 et seq.) following providing overlay data from the server (step 1012). This can include, for example, retargeting on a different network asset, or retargeting on the same network asset in an image having a different focus (e.g., with one or both of the asset or identifiers moving within the image).

Referring now to FIGS. 9-10 generally, in additional embodiments, other steps, or different orders of steps, can be performed by the mobile device and/or server. Additionally, other devices could be used as well; for example multiple technicians can simultaneously access a server using different mobile devices, or multiple servers, each of which are configured to provide different services (e.g., managing a network asset database, calculating triangulated positions of network assets based on received image data, or other features).

Furthermore, and referring now to FIGS. 1-10 generally, it is recognized that although the terms "mobile device" and "server" are used herein, it is recognized that any of a variety of types of computing devices could be used. Generally, the network asset tracking engine is implemented as software modules executable on a programmable circuit, such as a microprocessor. The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

Through use of the systems and methods described herein, reliable identification of specific assets and actions required for configuration of network assets is provided, thereby reducing erroneous connections or configurations of networking equipment and attendant downtime due to additional maintenance and correction of network asset configurations that might otherwise be required.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An asset location system comprising:
a mobile application component executable on a mobile device including a camera and a display, the mobile application component configured to receive image data from the camera and display an image on the display based on the image data and overlay information identifying one or more network assets identifiable in the image data, the one or more network assets associated with a plurality of identifiers, the plurality of identifiers uniquely identifying the one or more network assets and positioned at predetermined locations relative to the one or more network assets; and
an asset management tracking engine configured to receive the image data and generate the overlay information, the overlay information including an identification of a location of at least one of the one or more assets within the image;
wherein the location is determined at least in part based on a predetermined relative position of the asset and the plurality of identifiers.

2. The asset location system of claim 1, wherein the plurality of identifiers include light emitting diodes configured to emit a code corresponding to an identification of the one or more assets.

3. The asset location system of claim 1, wherein the at least one or more assets comprise network assets.

4. The asset location system of claim 3, wherein the identifiers uniquely identify a telecommunications rack holding the one or more network assets.

5. The asset location system of claim 4, wherein the one of more assets are selected from the group consisting of:
a network connectivity element;
a patch panel
a network switch;
a subrack;
a network blade; and
a rack system.

6. The asset location system of claim 1, wherein the overlay information further includes an identification of the at least one of the one or more assets.

7. The asset location system of claim 6, wherein the overlay information further includes information describing a state of the at least one of the one or more assets.

8. The asset location system of claim 7, wherein the information describing a state of the at least one of the one or more assets includes information selected from the group consisting of:
traffic load;
power consumption;
internal temperature;
memory usage;
available services at a particular port or device;
number of ports actively in use;
asset type;
error information;
warranty information;
connection information; and
system utilitzation.

9. The asset location system of claim 1, wherein the asset management tracking engine resides in a memory of the mobile device.

10. The asset location system of claim 1, wherein the asset management tracking engine resides at a network asset management location remote from the mobile device.

11. A network asset location system comprising:
- a mobile application component executable on a mobile device including a camera and a display, the mobile application component configured to receive image data from the camera and display an image on the display identifying one or more network assets identifiable in the image data;
- a plurality of identifiers associated with the one or more network assets, the one or more network assets each positioned at a known location relative each of the plurality of identifiers; and
- an asset management tracking engine configured to receive the image data and generate the overlay information, the overlay information including an identification of a location of at least one of the one or more network assets within the image and instructions for configuring the at least one of the one or more network assets.

12. The network asset location system of claim 11, wherein the image on the display includes overlay information including an identification of the one or more network assets.

13. A method of determining information about an asset using an application executing on a mobile device having a camera and a display, the method comprising:
- capturing image data of a network asset using the camera of the mobile device, the image data including information regarding a plurality of identifiers associated with the network asset and positioned at a predetermined location relative to the network asset; and
- displaying an image including overlay information identifying the network asset and a location of the network asset within the image;
- wherein the overlay information includes instructions for configuring the network asset.

14. The method of claim 13, wherein displaying the image occurs concurrently with capturing image data of the network asset.

15. The method of claim 13, wherein the image data comprises video data.

16. The method of claim 13, further comprising:
- transmitting the image data to a network asset management engine remote from the mobile device; and
- receiving the overlay information from the network asset management engine.

17. The method of claim 13, further comprising receiving feedback from a user of the mobile device indicating a modification to a configuration of the network asset.

18. The method of claim 13, further comprising, upon receiving selection of the asset by a user, displaying information describing the asset on the display, the information including asset identification information.

19. The method of claim 13, further comprising receiving at the display instructions defining a work order associated with the asset.

20. The method of claim 13, wherein the overlay information includes error information associated with the asset.

21. A method of determining an asset location using a network asset management engine, the method comprising:
- receiving image data including image data relating to a network asset, the image data also including information regarding a plurality of identifiers associated with the network asset and positioned at a predetermined location relative to the network asset;
- determining an identity of the network asset based at least in part on recognition of the plurality of identifiers and a relative position of the network asset relative to the plurality of identifiers in the image data; and
- generating overlay information identifying a location and an identity of the network asset in the image data
- wherein the overlay information includes instructions for configuring the network asset.

22. The method of claim 21, further comprising transmitting the overlay information for display to a user.

23. The method of claim 21, wherein the plurality of identifiers are selected from a group of identifiers consisting of:
- light emitting diodes strobing at a predetermined rate to communicate an identification code;
- bar codes;
- liquid crystal displays;
- QR codes; and
- unique images.

* * * * *